(12) United States Patent
Chen et al.

(10) Patent No.: US 10,528,108 B2
(45) Date of Patent: Jan. 7, 2020

(54) EXPANDING DEVICE

(71) Applicant: GIGA-BYTE TECHNOLOGY CO., LTD., Taipei (TW)

(72) Inventors: Kuei-Min Chen, Yangmei Taoyuan (TW); Chia-Home Lin, Yangmei Taoyuan (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 15/630,312

(22) Filed: Jun. 22, 2017

(65) Prior Publication Data

US 2018/0341308 A1    Nov. 29, 2018

(30) Foreign Application Priority Data

May 25, 2017    (TW) .............................. 106117370 A

(51) Int. Cl.
*G06F 1/26*    (2006.01)
*G06F 1/3231*  (2019.01)
*G06F 1/3296*  (2019.01)

(52) U.S. Cl.
CPC ............ *G06F 1/266* (2013.01); *G06F 1/3231* (2013.01); *G06F 1/3296* (2013.01); *Y02D 10/173* (2018.01)

(58) Field of Classification Search
CPC .................................. H05B 33/08; H02J 9/02
See application file for complete search history.

(56) References Cited

U.S. PATENT DOCUMENTS

| 8,077,028 B2* | 12/2011 | Lane ........................ G08B 3/10 340/506 |
| 9,967,149 B1* | 5/2018 | Fiennes ................. H04W 76/10 |
| 2002/0147924 A1* | 10/2002 | Flyntz ..................... G06F 21/32 726/4 |
| 2005/0188555 A1* | 9/2005 | Hung ....................... G01C 9/06 33/286 |
| 2009/0183015 A1 | 7/2009 | Song |
| 2011/0231682 A1 | 9/2011 | Kakish et al. |
| 2012/0290761 A1 | 11/2012 | Chen et al. |
| 2014/0156879 A1* | 6/2014 | Wong .................. G06F 11/3027 710/19 |

(Continued)

FOREIGN PATENT DOCUMENTS

TW    M357675 U    5/2009
TW    201124873 A  7/2011

(Continued)

OTHER PUBLICATIONS

Office Action dated Feb. 12, 2018 in TW Application No. 106117370 (6 pages).

(Continued)

*Primary Examiner* — Getente A Yimer
(74) *Attorney, Agent, or Firm* — Muncy, Geissler, Olds & Lowe, PC

(57) ABSTRACT

An expanding device including at least one connection port, a first luminescent element, a sensor and a micro-controller is provided. The connection port includes a power pin and at least one data pin. The first luminescent element is configured to generate first light. The sensor senses external light to generate a detection signal. The micro-controller controls the brightness or the color of the first light and controls the voltage level of the power pin.

13 Claims, 5 Drawing Sheets

(56) References Cited

U.S. PATENT DOCUMENTS

2014/0223041 A1\* 8/2014 Chang .................... G06F 13/28
710/27
2018/0092191 A1\* 3/2018 Siefer ................ H05B 37/0254

FOREIGN PATENT DOCUMENTS

| TW | 201135473 A | 10/2011 |
| TW | I378290 B | 12/2012 |
| TW | I457052 B | 10/2014 |
| TW | 201603422 A | 1/2016 |
| TW | I547038 B | 8/2016 |
| WO | WO2016/054377 A1 | 4/2016 |

OTHER PUBLICATIONS

European Search Report dated Feb. 1, 2018 in corresponding EP Application No. 17180683.9, 17 pages.

\* cited by examiner

EXPANDING DEVICE

CROSS REFERENCE TO RELATED APPLICATIONS

This Application claims priority of Taiwan Patent Application No. 106117370, filed on May 25, 2017, the entirety of which is incorporated by reference herein.

BACKGROUND OF THE INVENTION

Field of the Invention

The invention relates to an expanding device, and more particularly to an expanding device which is capable of controlling the voltage level of a connection port.

Description of the Related Art

Along with the new developments that are constantly being made in various technological fields, mobile electronic devices have been reduced in size. Using notebook computers as an example, a notebook computer generally comprises one or two connection ports. Therefore, the notebook computer can be coupled to one or two peripheral devices. A conventional method of communicating with many peripheral devices at once is to utilize a hub coupled to the notebook computer. Since the hub comprises many connection ports that can be coupled to many peripheral devices, the notebook computer is capable of communicating with many peripheral devices simultaneously.

BRIEF SUMMARY OF THE INVENTION

In accordance with an embodiment, an expanding device comprises at least one connection port, a first luminescent element, a sensor and a micro-controller. The connection port comprises a power pin and at least one data pin. The first luminescent element is configured to generate a first light. The sensor senses external light to generate a detection signal. The micro-controller controls the brightness or color of the first light and controls the voltage level of the power pin.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

Figure 1:
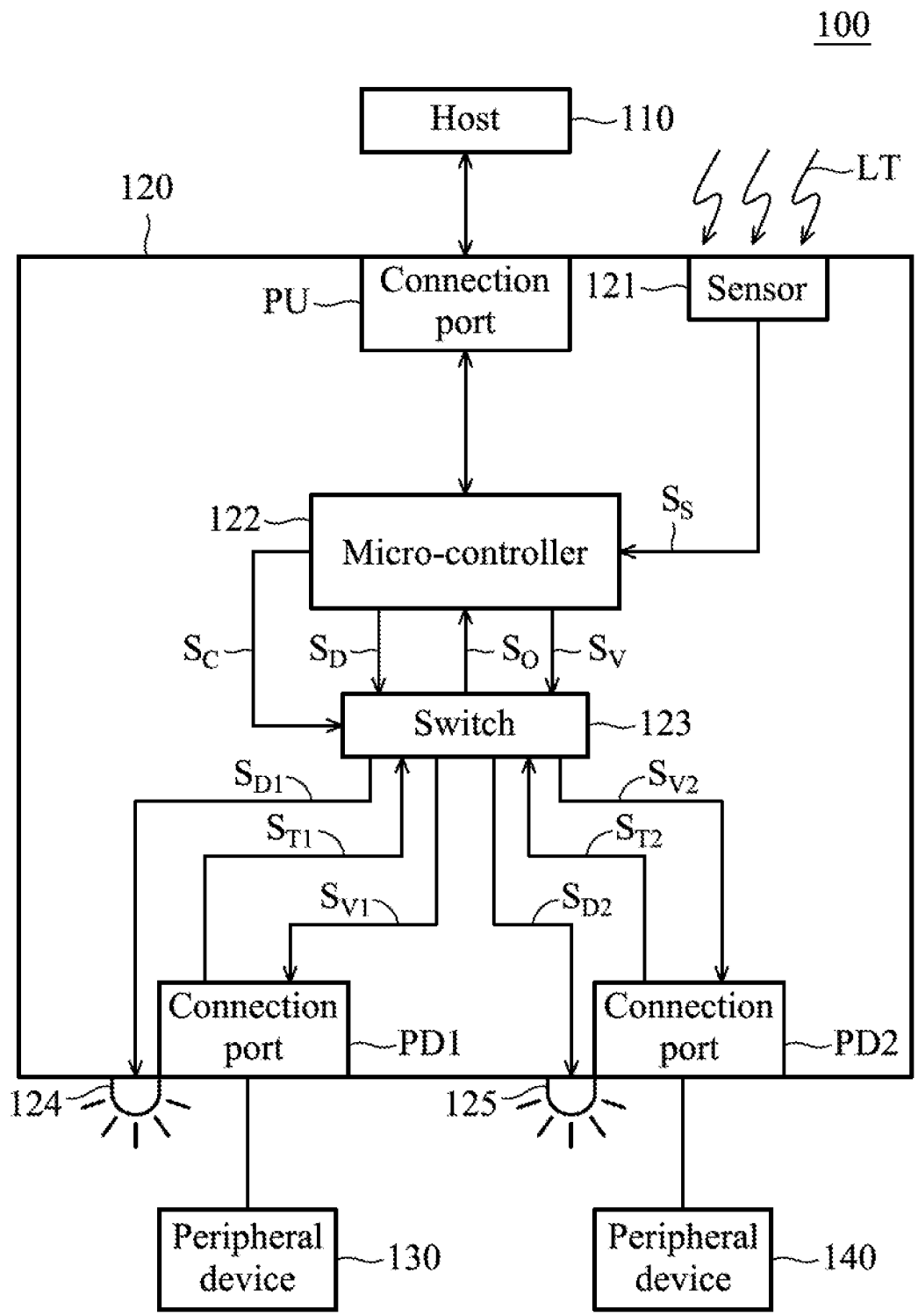
FIG. 1 is a schematic diagram of an exemplary embodiment of an operation system, according to various aspects of the present disclosure.

The present invention will be described with respect to particular embodiments and with reference to certain drawings, but the invention is not limited thereto and is only limited by the claims. The drawings described are only schematic and are non-limiting. In the drawings, the size of some of the elements may be exaggerated for illustrative purposes and not drawn to scale. The dimensions and the relative dimensions do not correspond to actual dimensions in the practice of the invention.

FIG. 1 is a schematic diagram of an exemplary embodiment of an operation system, according to various aspects of the present disclosure. The operation system 100 comprises a host 110, an expanding device 120 and peripheral devices 130 and 140. The host 110 receives information provided from the peripheral devices 130 and 140 via the expanding device 120 or provides information to the peripheral devices 130 and 140 via the expanding device 120. In some embodiments, the host 110 also provides power to the peripheral devices 130 and 140 via the expanding device 120. In one embodiment, the expanding device 120 is a hub. In the present invention, the number of peripheral devices is not limited. In some embodiments, the operation system 100 may comprise any suitable number of peripheral devices.

In this embodiment, the expanding device 120 comprises connection ports PU1, PD1 and PD2, a sensor 121, a micro-controller 122, a switch 123 and luminescent elements 124 and 125. The connection port PU is configured to couple to the host 110. The connection port PU transmits information provided from the host 110 to the micro-controller 122 or transmits information output from the micro-controller 122 to the host 110. In one embodiment, the connection port PU is referred to as an upstream port. In the present invention, the kind of connection port PU that may be used is not limited. In one embodiment, the connection port PU is a USB port. In this case, the USB port conforms to the USB 2.0 protocol, the USB 3.0 protocol, or the USB 3.1 protocol.

The connection port PD1 is configured to couple to the peripheral device 130. The connection port PD1 provides information from the peripheral device 130 to the micro-controller 122 or provides information from the micro-controller 122 to the peripheral device 130. The connection port PD2 is configured to couple to the peripheral device 140. The connection port PD2 transmits information provided by the peripheral device 140 to the micro-controller 122 or transmits information provided from the micro-controller 122 to the peripheral device 140. In one embodiment, each of the connection ports PD1 and PD2 comprises at least one power pin to receive power provided from the micro-controller 122. In one embodiment, the host 110 provides the power to the power pins of the connection ports PD1 and PD2 via the micro-controller 122.

Furthermore, each of the connection ports PD1 and PD2 further comprises at least one data pin. The data pin of the connection port PD1 is configured to transmit information provided from the peripheral device 130 to the micro-controller 122, and then the micro-controller 122 provides the information provided from the peripheral device 130 to the host 110. Additionally, the micro-controller 122 receives information provided from the host 110 and then provides the information provided from the host 110 to the connection port PD1. The data pin of the connection port PD1 is configured to transmit the information provided from the micro-controller 122 to the peripheral device 130. Furthermore, the data pin of the connection port PD2 is configured to transmit information provided from the peripheral device 140 to the micro-controller 122, and then the micro-controller 122 provides the information provided from the peripheral device 140 to the host 110. Additionally, the micro-controller 122 receives information provided from the host 110 and then provides the information provided from the host 110 to the connection port PD2. The data pin of the connection port PD2 is configured to transmit the information provided from the micro-controller 122 to the peripheral device 140. In other embodiments, each of the connection ports PD1 and PD2 is referred to as a downstream port. In the present invention, the type of each of the connection ports PD1 and PD2 is not limited. In one embodiment, both connection ports PD1 and PD2 are USB ports. In this case, each of the USB ports conforms to the USB 2.0 protocol, the USB 3.0 protocol, or the USB 3.1 protocol.

Using the connection port PD1 as an example, assume that the connection port PD1 is a USB port conforming to the USB 2.0 protocol and comprising a VBUS pin and data pins D+ and D−. The VBUS pin of the USB port serves as a power pin. In addition, the D+ pin and/or the D− pin of the USB port serves as a data pin. In other embodiments, assume that the connection port PD1 is a USB port conforming to the USB 3.0 protocol and comprising a VUBS pin, a D+ pin, a D− pin, a SSTX+ pin, a SSTX− pine and a SSRX+ pin. The VBUS pin of the USB port serves as a power pin. In addition, one or more of the D+ pin, the D− pin, the SSTX+ pin, the SSTX− pine, the SSRX+ pin or the SSRX− pin of the USB port serves as a data pin.

The luminescent element 124 is disposed by the connection port PD1 to indicate the operation state of the connection port PD1. The luminescent element 125 is disposed by the connection port PD2 to indicate the operation state of the connection port PD2. Using the connection port PD1 as an example, when the data pin of the connection port PD1 is transmitting data, it means that the connection port PD1 operates in a normal mode. Therefore, the brightness and/or the color of the light emitted from the luminescent element 124 matches a pre-determined value. When the data pin of the connection port PD1 is not transmitting data, it means that the connection port PD1 operates in a sleep mode. Therefore, one or both of the brightness and the color of the light emitted from the luminescent element 124 does not match the pre-determined value. For example, when the connection port PD1 operates in the normal mode, the brightness of the light emitted from the luminescent element 124 is a first brightness value or the color of the light emitted from the luminescent element 124 is a first color. When the connection port PD1 operates in the sleep mode, the brightness of the light emitted from the luminescent element 124 is a second brightness value or the color of the light emitted from the luminescent element 124 is a second color. In one embodiment, the second brightness value is less than the first brightness value. In other embodiments, the first color is different from the second color. In this embodiment, the number of luminescent elements is equal to the number of connection ports.

The sensor 121 senses external light LT to generate a detection signal $S_S$. In one embodiment, the external light LT is ambient light, such as the light emitted from the sun or from a light source disposed in a room. In another embodiment, the external light LT is reflection light. In this case, the reflection light is reflected from an object in response to the light emitted from the sensor 121.

Figure 4A:
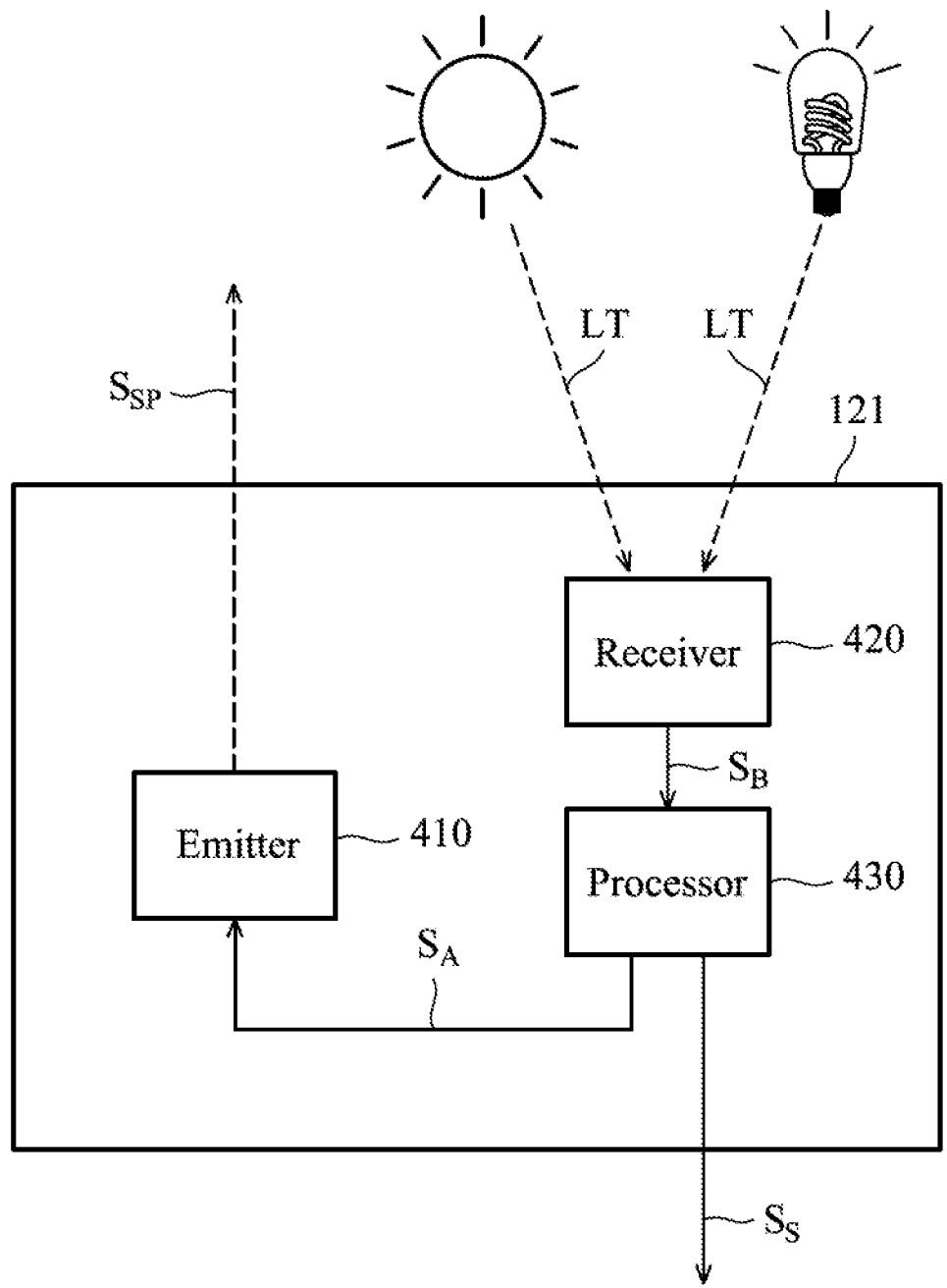
FIG. 4A is a schematic diagram of an exemplary embodiment of a sensor, according to various aspects of the present disclosure.
Figure 4B:
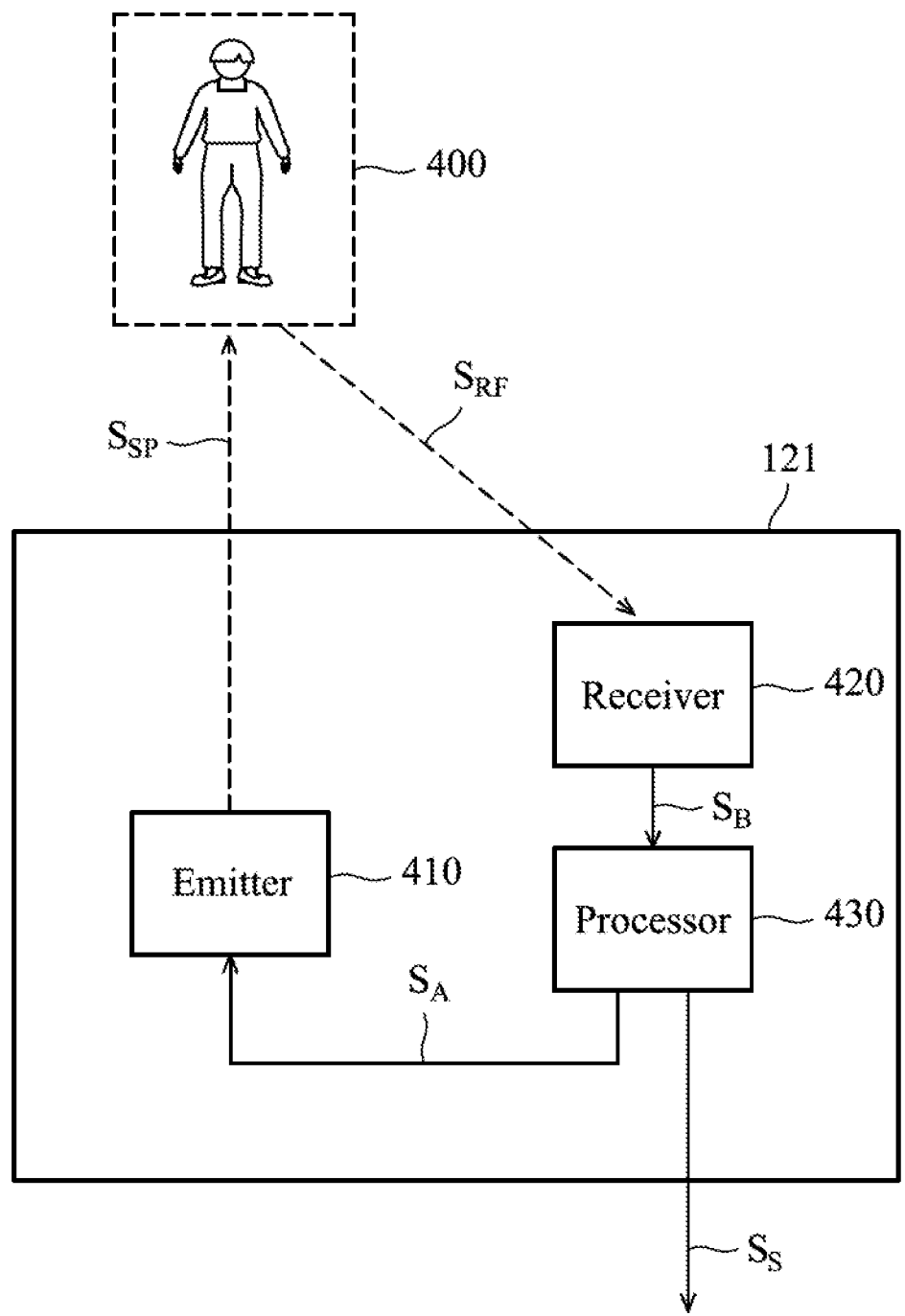
FIG. 4B is a schematic diagram of another exemplary embodiment of the sensor, according to various aspects of the present disclosure.

In the present invention, the kind of sensor 121 that may be used is not limited. In one embodiment, the sensor 121 is an optical sensor. In this embodiment, the sensor 121 has a sensing function and a luminescent function. FIGS. 4A and 4B are exemplary embodiments of the sensor 121. Refer to FIG. 4A, the sensor 121 comprises an emitter 410, a receiver 420 and a processor 430. The emitter 410 generates a specific signal $S_{SP}$ according to an activation signal $S_A$. The receiver 420 receives the external light LT and generates a brightness signal $S_B$ according to the external light LT. In one embodiment, the external light LT is ambient light, such as the light emitted from the sun or from a light source disposed in a room. The processor 430 processes the brightness signal $S_B$ to generate the detection signal $S_S$.

In FIG. 4B, the external light received by the receiver 420 is a reflection signal. The reflection signal relates to the kind of specific signal $S_{SP}$ used. For example, if the specific signal $S_{SP}$ is a light signal (e.g. infrared rays), the reflection signal is also a light signal. If the specific signal $S_{SP}$ is a sound signal (e.g. ultrasonic wave), the reflection signal is a sound signal. As shown in FIG. 4B, the processor 430 generates the activation signal $S_A$ to the emitter 410. The emitter 410 generates the specific signal $S_{SP}$ according to the activation signal $S_A$. When a user 400 approaches the sensor 121, the sensor 121 emits the specific signal $S_{SP}$ toward the user 400. Therefore, a reflection signal $S_{RF}$ is reflected from the user 400 in response to the specific signal $S_{SP}$. The receiver 420 generates the brightness signal $S_B$ according to the reflection signal $S_{RF}$. In this embodiment, the sensor 121 senses the brightness of the external light and provides a specific signal to determine whether an object approaches the expanding device 120.

In FIG. 1, the micro-controller 122 controls the brightness and the colors of the lights emitted from the luminescent elements 124 and 125 according to the detection signal $S_S$ and the voltage levels of the data pins of the connection ports PD1 and PD2. The micro-controller 122 further controls the voltage levels of the power pins of the connection ports PD1 and PD2 according to the detection signal $S_S$ and the voltage levels of the data pins of the connection ports PD1 and PD2. In this embodiment, the micro-controller 122 utilizes the switch 123 to indirectly connect to the luminescent elements 124 and 125. The micro-controller 122 also utilizes the switch 123 to indirectly connect to the data pins and the power pins of the connection ports PD1 and PD2, but the disclosure is not limited thereto. In other embodiments, the switch 123 is omitted or integrated into the micro-controller 122. In this case, the micro-controller 122 is directly connected to the luminescent elements 124 and 125, the data pins of the connection ports PD1 and PD2, and the power pins of the connection ports PD1 and PD2.

The switch 123 is coupled to the data pins of the connection ports PD1 and PD2. The switch 123 uses the voltage level $S_{T1}$ of the data pin of the connection port PD1 or the voltage level $S_{T2}$ of the data pin of the connection port PD2 as an output level $S_O$ according to a control signal $S_C$ and provides the output level $S_O$ to the micro-controller 122. The micro-controller 122 determines whether the data pin of the connection port PD1 or the connection port PD2 is transmitting data according to the output level $S_O$.

In one embodiment, the micro-controller 122 generates a driving signal $S_D$ and a voltage signal $S_V$ according to the output level $S_O$. The driving signal $S_D$ is utilized to control at least one of the brightness and the color of the light emitted from one of the luminescent elements 124 and 125. In the present invention, the type of driving signal $S_D$ that is used is not limited. In one embodiment, the driving signal $S_D$ is a current signal. Additionally, the driving signal $S_D$ is utilized to set the voltage levels of the power pins of each of the connection ports PD1 and PD2.

As shown in FIG. 1, the switch 123 uses the driving signal $S_D$ as a driving signal $S_{D1}$ or a driving signal $S_{D2}$ according to the control signal $S_C$ and provides the driving signal $S_{D1}$ or $S_{D2}$ to the luminescent element 124 or 125. The brightness and the color of the light emitted from the luminescent element 124 are controlled by the driving signal $S_{D1}$. The brightness and the color of the light emitted from the luminescent element 125 are controlled by the driving signal $S_{D2}$. Furthermore, the switch 123 serves the voltage signal $S_V$ as a voltage signal $S_{V1}$ or a voltage signal $S_{V2}$ according to the control signal $S_C$ and provides the voltage signal $S_{V1}$ to the power pin of the connection port PD1 or provides the voltage signal $S_{V2}$ to the power pin of the connection port PD2.

Since the method controlling the connection port PD1 and the luminescent element 124 is the same as the method controlling the connection port PD2 and the luminescent element 125, the method controlling the connection port PD1 and the luminescent element 124 is provided as an example. When the voltage level $S_{T1}$ of the data pin of the connection port PD1 is not equal to a pre-determined value, it means that the data pin of the connection port PD1 is transmitting data. Therefore, the micro-controller 122 provides a first voltage signal (e.g. 5V) to the power pin of the connection port PD1 via the switch 123. At this time, the connection port PD1 operates in a normal mode. However, when the voltage level $S_{T1}$ of the data pin of the connection port PD1 is equal to the pre-determined value, it means that the data pin of the connection port PD1 is not transmitting data. Therefore, the micro-controller 122 provides a second voltage signal (e.g. 4.5V) to the power pin of the connection port PD1 via the switch 123. At this time, the connection port PD1 operates in a sleep mode. In this embodiment, the voltage level of the second voltage signal is lower than the voltage level of the first voltage signal. In another embodiment, when the connection port PD1 does not connect to the peripheral device 130, the micro-controller 122 sets the voltage level of the power pin of the connection port PD1 to 0V. At this time, the connection port PD1 operates in the sleep mode.

In some embodiments, when the connection port PD1 operates in the sleep mode, if the voltage level $S_{T1}$ of the data pin of the connection port PD1 is not equal to the pre-determined value, it means that the data pin of the connection port PD1 starts transmitting data. Therefore, the micro-controller 122 again provides the first voltage signal (e.g. 5V) to the power pin of the connection port PD1. At this time, the connection port PD1 exits the sleep mode and enters the normal mode.

In one embodiment, when the micro-controller 122 controls the voltage level of the power pin of the connection port PD1, the micro-controller 122 also sets the brightness and/or the color of the light emitting from the luminescent element 124. For example, when the connection port PD1 operates in the normal mode, the micro-controller 122 sets the brightness of the light emitted from the luminescent element 124 to a first brightness value. In this case, the micro-controller 122 may set the color of the light emitted from the luminescent element 124 to a first color. However, when the connection port PD1 operates in the sleep mode, the micro-controller 122 reduces the brightness of the light emitted from the luminescent element 124. In this case, the brightness of the light emitted from the luminescent element 124 may be a second brightness value. The second brightness value less than the first brightness value. In such case, the micro-controller 122 may set the color of the light emitted from the luminescent element 124 to a second color that is different than the first color. In other words, when the operation mode of the connection port PD1 is changed, the brightness and/or color of the light emitted from the luminescent element 124 changes.

In another embodiment, when the connection port PD1 operates in the sleep mode, the micro-controller 122 adjusts one or both of the brightness and the color of the light emitted from the luminescent element 124 according to the detection signal $S_S$. For example, when the detection signal $S_S$ is less than a pre-determined value, it means that the brightness of the external light is low. In one embodiment, when a user turns off the light source disposed in a room where there is the expanding device 120 or the user leaves the room, the brightness of the external light is low. Therefore, the micro-controller 122 reduces the brightness of the light emitted from the luminescent element 124. For example, the micro-controller 122 sets the brightness of the light emitted by the luminescent element 124 to the second brightness value. In this case, the micro-controller 122 may change or maintain the color of the light emitted from the luminescent element 124. However, when the detection signal $S_S$ is higher than the pre-determined value, it means that the user again turns on the light source disposed in the room where there is the expanding device. Therefore, the micro-controller 122 increases the brightness of the light emitted from the luminescent element 124. In one embodiment, the micro-controller 122 sets the brightness of the light emitted from the luminescent element 124 to the first brightness value. At this time, the micro-controller 122 may set the color of the light emitted from the luminescent element 124 to the first color. Additionally, the user may intend to use the expanding device 120. Therefore, the micro-controller 122 provides the first voltage signal to the power pin of the connection port PD1. At this time, the connection port PD1 exits the sleep mode and enters the normal mode. In some embodiments, if the user does not turn on the light source disposed in the room and approaches the expanding device 120, since the sensor 121 emits the specific signal (e.g. infrared rays) toward the user, a reflection signal (e.g. the external light) is reflected from the user in response to the specific signal and exceeds the pre-determined value. Therefore, the micro-controller 122 sets the brightness of the light emitted from the luminescent element 124 to the first brightness value. At this time, the connection port PD1 exits the sleep mode and enters the normal mode.

Figure 2:
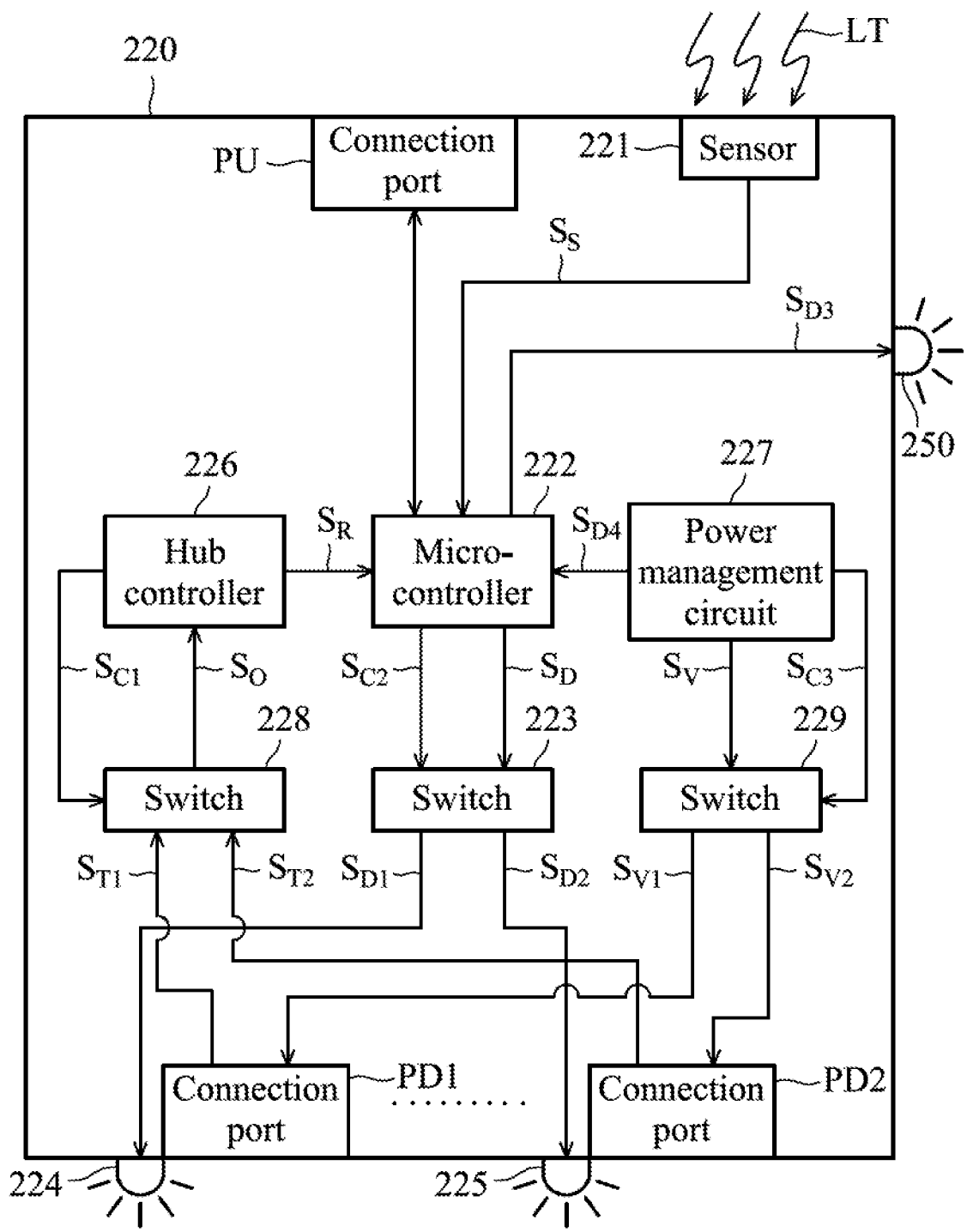
FIG. 2 is a schematic diagram of an exemplary embodiment of an expanding device, according to various aspects of the present disclosure.

FIG. 2 is a schematic diagram of an exemplary embodiment of an expanding device, according to various aspects of the present disclosure. The expanding device 220 shown in FIG. 2 is similar to the expanding device 120 shown in FIG. 1 with the exception that the expanding device 220 further comprises a hub controller 226, a power management circuit 227, switches 228 and 229, and a luminescent element 250. Since the features of the connection ports PU, PD1, and PD2, the sensor 221, and the luminescent elements 224 and 225 are the same as the features of the connection ports PU, PD1, and PD2, the sensor 121, and the luminescent elements 124 and 125 shown in FIG. 1, the features of the connection ports PU, PD1, and PD2, the sensor 221, and the luminescent elements 224 and 225 are omitted.

In this embodiment, the hub controller 226 is configured to detect the voltage level $S_{T1}$ of the data pin of the connection port PD1 and the voltage level $S_{T2}$ of the data pin of the connection port PD2 and generate a detection result $S_R$ and send it to the micro-controller 222. In one embodiment, the hub controller 226 utilizes an I2C protocol to provide the micro-controller 222 with the detection result $S_R$, but the disclosure is not limited thereto. In some embodiments, the hub controller 226 utilizes other protocols to provide the micro-controller 222 with the detection result $S_R$.

In this embodiment, the hub controller 226 is coupled to the data pins of the connection ports PD1 and PD2 via the switch 228. The switch 228 selectively uses the voltage level $S_{T1}$ of the data pin of the connection port PD1 as an output level $S_O$, or it uses the voltage level $S_{T2}$ of the data pin of the connection port PD2 as the output level $S_O$, according to a control signal $S_{C1}$. The switch 228 provides the output level $S_O$ to the hub controller 226. In this embodiment, the control signal $S_{C1}$ is generated by the hub controller 226, but the disclosure is not limited thereto. In other embodiments, the control signal $S_{C1}$ may be generated by the micro-controller 222. Additionally, the switch 228 may be omitted to reduce the element cost of the expanding device 220. In this case, the hub controller 226 is directly coupled to the data pins of the connection ports PD1 and PD2. In one embodiment, the switch 228 is integrated into the hub controller 226.

The micro-controller 222 determines whether the data pin of the connection port PD1 or the connection port PD2 is transmitting data according to the detection result $S_R$. Using the connection port PD1 as an example, when the data pin of the connection port PD1 is transmitting data, the micro-controller 222 controls the brightness of the light emitted from the luminescent element 224 to equal to a pre-determined brightness. When the data pin of the connection port PD1 is not transmitting data, the micro-controller 222 reduces the brightness of the light emitted from the luminescent element 224. In another embodiment, the micro-controller 222 controls one or both of the brightness or the color of the light emitted from the luminescent element 124 according to the detection signal $S_S$. For example, when the detection signal $S_S$ is higher than a pre-determined value, the micro-controller 222 sets the brightness of the light emitted from the luminescent element 124 to a pre-determined brightness. When the detection signal $S_S$ is lower than the pre-determined value, the micro-controller 222 reduces the brightness of the light emitted from the luminescent element 124.

The invention does not limit how the micro-controller 222 controls the luminescent element 224. In one embodiment, the micro-controller 222 is coupled to the luminescent elements 224 and 225 via a switch 223. The micro-controller 222 generates a control signal $S_{C2}$ to the switch 223. The switch 223 uses the driving signal $S_D$ generated by the micro-controller 222 as a driving signal $S_{D1}$ or a driving signal $S_{D2}$ according to control signal $S_{C2}$. The switch 223 provides the driving signal $S_{D1}$ or $S_{D2}$ to the luminescent element 224 and 225. The luminescent element 224 is activated according to the driving signal $S_{D1}$. The luminescent element 225 is activated according to the driving signal $S_{D2}$. In another embodiment, the switch 223 is omitted. In this case, the micro-controller 222 is directly connected to the luminescent elements 224 and 225. In other embodiments, the switch 223 is integrated to the micro-controller 222.

Furthermore, the micro-controller 222 generates a driving signal $S_{D3}$ according to the detection result $S_R$ to control the brightness and/or the color of the light emitted from the luminescent element 250. For example, when one of the connection ports PD1 and PD2 operates in the normal mode, the micro-controller 222 utilizes the driving signal $S_{D3}$ to set the brightness of the light emitted from the luminescent element 250 at a third brightness value. At this time, the light emitted from the luminescent element 250 has a third color. However, when each of the connection ports PD1 and PD2 operates in the sleep mode, the micro-controller 222 utilizes the driving signal $S_{D3}$ to set the brightness of the light emitted from the luminescent element 250 at a fourth brightness value, wherein the fourth brightness value is less than the third brightness value. At this time, the light emitted from the luminescent element 250 may have a fourth color. The fourth color is different from the third color. Therefore, the user is capable of determining which modes the connection ports PD1 and PD2 operate in according to the brightness and the color of the light emitted from the luminescent element 250.

In other embodiments, the micro-controller 222 generates a driving signal $S_{D4}$ to the power management circuit 227 according to the detection result $S_R$ to adjust the voltage levels of the power pins of the connection ports PD1 and PD2. For example, when the data pin of the connection port PD1 is transmitting data, the micro-controller 222 sets the voltage level of the power pin of the connection port PD1 to a pre-determined level, such as 5V. When the data pin of the connection port PD1 does not transmit data, the micro-controller 222 reduces the voltage level of the power pin of the connection port PD1. In another embodiment, the micro-controller 222 adjusts the voltage levels of the power pins of the connection ports PD1 and PD2 according to the detection signal $S_S$. For example, when the detection signal $S_S$ is higher than a pre-determined value, the micro-controller 222 sets the voltage level of the power pin of the connection port PD1 to a pre-determined level, such as 5V. When the detection signal $S_S$ is less than the pre-determined value, the micro-controller 222 reduces the voltage level of the power pin of the connection port PD1. In one embodiment, the priority of the detection result $S_R$ is higher than the priority of the detection signal $S_S$. Therefore, the detection result $S_R$ serves as the main signal and the micro-controller 222 controls the luminescent elements 225 and 225 and the voltage levels of the power pins of the connection ports PD1 and PD2 according to the main signal. Additionally, when the connection port PD1 or PD2 operates in the sleep mode, the micro-controller 222 considers that the detection signal $S_S$ is another main signal. Therefore, the micro-controller 222 controls the luminescent elements 225 and 225 and the voltage levels of the power pins of the connection ports PD1 and PD2 according to the detection signal $S_S$.

In one embodiment, the micro-controller 222 utilizes an I2C protocol to communicate with the power management circuit 227, but the disclosure is not limited thereto. In this embodiment, the power management circuit 227 is coupled to the power pins of the connection ports PD1 and PD2 via a switch 229. As shown in FIG. 2, the power management circuit 227 generates a control signal $S_{C3}$ to the switch 229. The switch 229 uses the voltage signal $S_V$ generated by the power management circuit 227 as a voltage signal $S_{V1}$ or $S_{V2}$ according to the control signal $S_{C3}$. Then, the switch 229 provides the voltage signal $S_{V1}$ or $S_{V2}$ to the power pin of the connection port PD1 or PD2. In some embodiments, the switch 229 is omitted or integrated into the power management circuit 227. In this case, the power management circuit 227 is directly connected to the power pins of the connection ports PD1 and PD2. In other embodiments, the control signal $S_{C3}$ is generated from the micro-controller 222.

Figure 3:
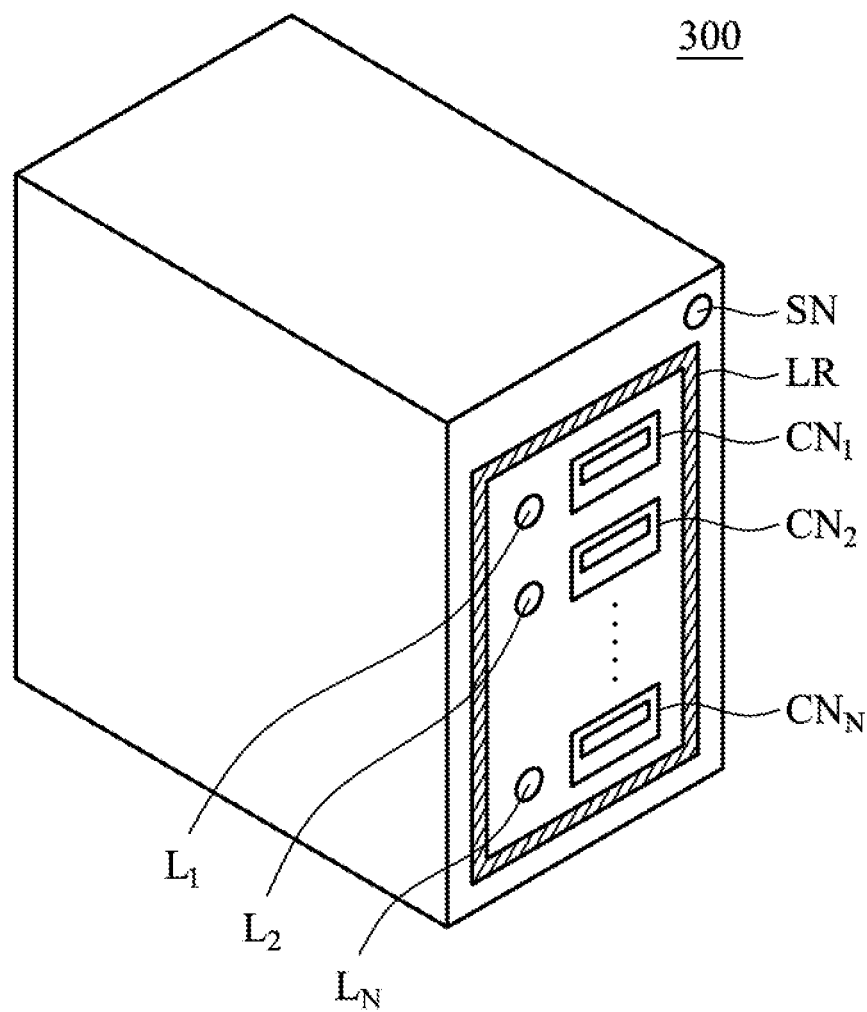
FIG. 3 is an exterior schematic diagram of an exemplary embodiment of the expanding device, according to various aspects of the present disclosure.

FIG. 3 is an exterior schematic diagram of an exemplary embodiment of the expanding device, according to various aspects of the present disclosure. The expanding device 300 comprises a sensor SN, connection ports $CN_1$~$CN_N$, luminescent elements $L_1$~$L_n$ and a luminescent area LR. The luminescent elements $L_1$~$L_N$ correspond to the respective connection ports $CN_1$~$CN_N$. In this embodiment, the brightness and the colors of the luminescent elements $L_1$~$L_N$ relate to the operation modes of the respective connection ports $CN_1$~$CN_N$. Using the connection port $CN_1$ as an example, when the connection port $CN_1$ is not coupled to a peripheral device, the luminescent element $L_1$ is deactivated. Therefore, no light is emitted from the luminescent element $L_1$. When the connection port $CN_1$ is coupled to a peripheral device and the data pin of the connection port $CN_1$ is transmitting data, the luminescent element $L_1$ is activated to emit light and the brightness of the light emitted from the luminescent element $L_1$ is equal to a pre-determined brightness. When the data pin of the connection port $CN_1$ does not transmit data, the brightness of the light emitted from the luminescent element $L_1$ is reduced.

In other embodiments, the color of the light emitted from the luminescent element $L_1$ relates to the operation mode of the connection port $CN_1$. For example, when the data pin of the connection port $CN_1$ is transmitting data, the color of the light emitted from the luminescent element $L_1$ is equal to a first color. When the data pin of the connection port $CN_1$ does not transmit data, the color of the light emitted from the luminescent element $L_1$ is equal to a second color that is different than the first color.

The connection ports $CN_1 \sim CN_N$ and the luminescent elements $L_1 \sim L_N$ are surrounded by the luminescent area LR. The luminescent area LR indicates the operation mode of the expanding device 300. For example, when one of the connection ports $CN_1 \sim CN_N$ is transmitting data, the luminescent area LR displays a first brightness or a third color. When each of the connection ports $CN_1 \sim CN_N$ does not transmit data, the luminescent area LR displays a second brightness or a fourth color. The second brightness is lower than the first brightness. The fourth color is different than the second color.

Additionally, the brightness and the colors of the light emitted from the luminescent elements $L_1 \sim L_N$ and the luminescent area LR are also affected by the detection result generated by the sensor SN. For example, when each of the connection ports $CN_1 \sim CN_N$ does not transmit data, if the detection result generated by the sensor SN is less than a pre-determined value, it means that a user may turn off the light source disposed in a room where there is the expanding device 300. Therefore, the brightness of the light emitted from at least one of the luminescent elements $L_1 \sim L_N$ and the luminescent area LR is reduced. However, when the user approaches the expanding device 300 or the user turns on the light source, it means the user desires to use the expanding device 300. Therefore, the brightness of the light emitted from at least one of the luminescent elements $L_1 \sim L_N$ and the luminescent area LR is increased.

In other embodiments, the voltage level of the power pin of one of the connection ports $CN_1 \sim CN_N$ relates to the operation mode of the corresponding connection port. Using the connection port $CN_1$ as an example, when the connection port $CN_1$ is transmitting data, the voltage level of the power pin of the connection port $CN_1$ is equal to a pre-determined level, such as 5V. When the connection port $CN_1$ does not transmit data, the voltage level of the power pin of the connection port $CN_1$ is less than the pre-determined level. In one embodiment, when the connection port $CN_1$ is not coupled to a peripheral device, the voltage level of the power pin of the connection port $CN_1$ is equal to 0V.

In one embodiment, when the voltage level of the power pin of the connection port $CN_1$ is not equal to the pre-determined level (e.g. 5V), if the detection result generated by the sensor SN exceeds a pre-determined value, it means that the user desires to use the expanding device 300. Therefore, the micro-controller in the expanding device 300 sets the voltage level of the power pin of the connection port $CN_1$ to a level that is equal to the pre-determined level.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). For example, it should be understood that the system, device and method may be realized in software, hardware, firmware, or any combination thereof. Therefore, the scope of the appended claims should be accorded the broadest interpretation so as to encompass all such modifications and similar arrangements.

What is claimed is:

1. An expanding device coupled between a host and at least one peripheral device, comprising:
   at least one connection port comprising a power pin and at least one data pin and configured to couple the peripheral device;
   a first luminescent element configured to generate first light;
   a sensor sensing external light to generate a detection signal; and
   a micro-controller controlling brightness or color of the first light and controlling a voltage level of the power pin, wherein the expanding device provides power provided by the host to the peripheral device,
   wherein:
   in response to a voltage level of the data pin not being equal to a first pre-determined value, the micro-controller directs the connection port to operate in a normal mode and sets the brightness of the first light to a first brightness value,
   in response to the voltage level of the data pin being equal to the first pre-determined value, the micro-controller directs the connection port to operate in a sleep mode and sets the brightness of the first light to a second brightness value which is less than the first brightness value,
   in response to the connection port operating in the sleep mode and the detection signal being higher than a second pre-determined value, the micro-controller sets the brightness of the first light to the first brightness value from the second brightness value.

2. The expanding device as claimed in claim 1, further comprising:
   a hub controller detecting the voltage level of the data pin to generate a detection result and providing the detection result to the micro-controller.

3. The expanding device as claimed in claim 2, wherein the hub controller utilizes an I2C protocol to communicate with the micro-controller.

4. The expanding device as claimed in claim 3, wherein in response to the voltage level of the data pin not being equal to the first pre-determined value, the micro-controller sets the voltage level of the power pin to a first pre-determined level, and in response to the voltage level of the data pin being equal to the first pre-determined value, the micro-controller sets the voltage level of the power pin to a second pre-determined level that is lower than the first pre-determined value.

5. The expanding device as claimed in claim 4, further comprising:
   a second luminescent element providing second light, wherein the micro-controller controls brightness or a color of the second light according to the voltage level of the data pin.

6. The expanding device as claimed in claim 2, further comprising:
   a power management circuit controlled by the micro-controller to adjust the voltage level of the power pin.

7. The expanding device as claimed in claim 6, wherein the micro-controller utilizes an I2C protocol to communicate with the power management circuit.

8. The expanding device as claimed in claim 1, wherein the sensor comprises:
   an emitter generating a specific signal according to an activation signal;
   a receiver receiving the external light to generate a brightness signal; and
   a processor generating the activation signal and processing the brightness signal to generate the detection signal.

9. The expanding device as claimed in claim 8, wherein the external light is ambient light.

10. The expanding device as claimed in claim 8, wherein a reflection signal is reflected from an object in response to the specific signal, and the external light is the reflection signal.

11. The expanding device as claimed in claim 1, wherein the micro-controller controls the brightness or the color of the first light and controls the voltage level of the power pin according to the voltage level of the data pin and the detection signal.

12. The expanding device as claimed in claim 1,
   wherein in response to the voltage level of the data pin and the detection signal not being equal to the first pre-determined value, the micro-controller provides a first voltage signal to the power pin and sets the brightness of the first luminescent element to the first brightness value,
   wherein in response to the voltage level of the data pin and the detection signal being equal to the first pre-determined value, the micro-controller provides a second voltage signal to the power pin and sets the brightness of the first luminescent element to the second brightness value.

13. The expanding device as claimed in claim 12, wherein the second voltage signal is less than the first voltage signal.

* * * * *